United States Patent [19]
Engstrom

[11] Patent Number: 5,931,190
[45] Date of Patent: Aug. 3, 1999

[54] RELIEF VALVE

[75] Inventor: Carl A. Engstrom, Worcester, Mass.

[73] Assignee: Watts Investment Company, Wilmington, Del.

[21] Appl. No.: 09/106,271

[22] Filed: Jun. 29, 1998

[51] Int. Cl.[6] .............................. F16K 15/00; F16K 31/00
[52] U.S. Cl. ............................................ 137/535; 251/337
[58] Field of Search ............................ 137/535; 251/337, 251/336

[56] References Cited

U.S. PATENT DOCUMENTS

| | | | |
|---|---|---|---|
| 131,073 | 9/1872 | Woodward | 137/535 |
| 205,566 | 7/1878 | Miller | 137/535 |
| 711,792 | 10/1902 | Smith | 137/535 |
| 844,755 | 2/1907 | Schalow | 137/535 |
| 1,246,892 | 11/1917 | Donnelly | 137/535 |
| 1,291,497 | 1/1919 | Harris | 137/535 |
| 2,020,096 | 11/1935 | Bergstrom | 137/535 |
| 2,071,215 | 2/1937 | Petersen | 137/535 |
| 2,214,459 | 9/1940 | Gottlieb | 137/535 |

*Primary Examiner*—Denise L. Ferensic
*Assistant Examiner*—Joanne Y. Kim
*Attorney, Agent, or Firm*—Fish & Richardson P.C.

[57] ABSTRACT

A relief valve assembly includes a valve element mounted for movement along a valve axis between a sealing position and a relief position. A spring arm engaged with the valve element urges the valve element toward the sealing position. The spring arm has a free end engaged upon a cam surface. Movement of the valve element between the sealing and relief positions causes movement of the free end of the spring arm along the cam surface. Movement of the valve element toward the relief position causes movement of the free end of the spring arm along the cam surface increasing spacing of the free end of the spring arm from the valve axis and increasing spring force of the free end of the spring arm upon the cam surface. This maintains a substantially constant, predetermined spring force component urging the valve element toward the sealed position.

17 Claims, 7 Drawing Sheets

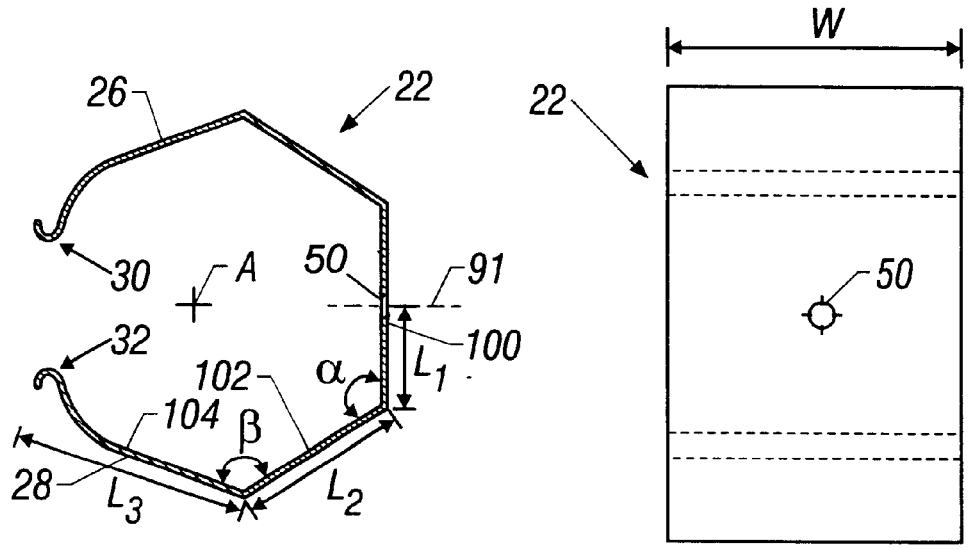
FIG. 3A  FIG. 3B
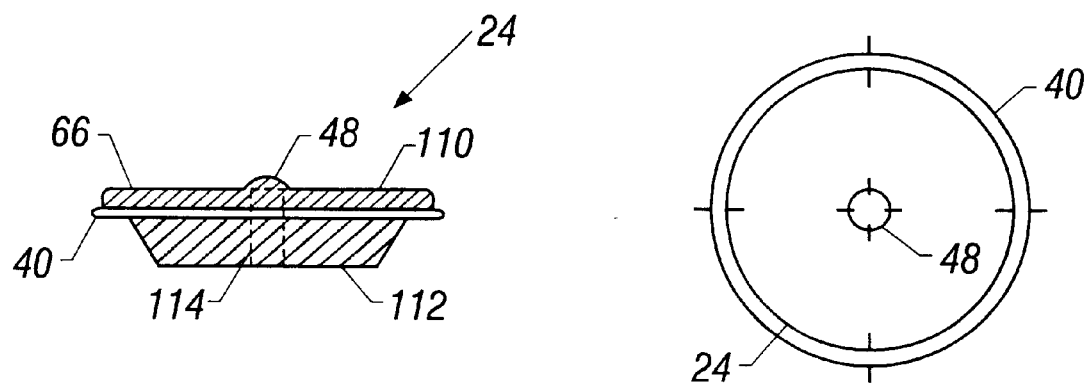
FIG. 4A  FIG. 4B

5,931,190

RELIEF VALVE

BACKGROUND OF THE INVENTION

This invention relates to a relief valve for venting excess pressure.

In pressurized systems, such as plumbing systems in high rise buildings having rooftop tanks for maintaining water pressure on upper floors, the introduction of air into the system can create high pressure events which can cause catastrophic failures. For example, when a slug of water is trapped between two air pockets, and a fixture is used letting the downstream pocket of air escape, the slug is accelerated to very high speed by the expanding air behind the slug. When the slug impacts the fixture, damage occurs. An automatic relief valve can prevent catastrophic failure and potential personal injuries or property damage.

It is known to relieve excess pressure in plumbing pipes with a relief valve having a huddle chamber. Such relief valves are bulky and require two operating pressures: the cracking pressure necessary to unseat the valve, and the opening pressure necessary to fully operate the valve.

SUMMARY OF THE INVENTION

According to the invention, a relief valve assembly includes a valve element mounted for movement generally along a valve axis between a first, sealing position in sealing engagement upon a valve seat, and a second, relief position removed from sealing engagement with the valve seat. A spring arm engaged with the valve element urges the valve element toward the sealing position. The spring arm has a free end engaged upon a cam surface. Movement of the valve element between the sealing and relief positions causes movement of the free end of the spring arm along the cam surface. The cam surface is disposed relative to the valve axis in a manner whereby movement of the valve element toward the relief position causes movement of the free end of the spring arm along the cam surface in a manner to increase spacing of the free end of the spring arm from the valve axis.

Preferred embodiments of the invention may include one or more of the following additional features. The cam surface is an outer surface of a pipe. A structure, e.g., a shroud surrounding the spring arm, limits displacement of the valve element away from the valve seat. The pipe defines the valve seat and the shroud is mounted to the pipe opposite the valve seat. The shroud is sized relative to the spring arm to restrict movement of the free end of the spring arm on the cam surface beyond a point of inversion. The spring arm is formed from spring steel.

The spring arm and cam surface are configured such that the valve element moves from the sealing position at a pressure of about 12 psi. Movement of the free end of the spring arm along the cam surface in response to movement of the valve element toward the relief position causes an increase of spring force of the free end of the spring arm upon the cam surface. This maintains a substantially constant, predetermined spring force component urging the valve element toward the sealed position. An alignment pin and a guide member facilitate positioning of the spring arm relative to the valve element.

The valve element defines a first sealing surface and a second sealing surface, and the valve seat defines a first seating surface and a second seating surface. The first seating surface engages the first sealing surface to define a first seal when the valve element is in the sealing position. The second seating surface engages the second sealing surface to define a second seal when the valve element is in a position between the sealing position and the relief position. The radius of the second seal is greater than the radius of the first seal.

According to another aspect of the invention, a relief valve for an aperture defined in a wall of a pipe by a circumferential valve seat includes a valve element and first and second spring arms.

According to a particular embodiment of this aspect of the invention, the spring arms are located at opposed sides of a valve axis and move apart as the valve element moves toward a relief position.

Advantages of the invention include a relief valve having a low profile and which is relatively inexpensive. In response to excess pressure in plumbing pipes, the relief valve unseats to relieve the pressure in a controlled, predictable manner by employing a constant spring force component operating at a single pressure. The resistance to staying open is less and thus the rate of flow of vented fluid is greater with the relief valve of the invention than in a conventional valve in which the spring force increases as the valve opens.

BRIEF DESCRIPTION OF THE DRAWINGS

FIG. 3A illustrates a spring of the relief valve assembly;

FIG. 3B is a side view of the spring of FIG. 3A;

FIG. 4A is a cross-sectional view of a relief valve element of the relief valve assembly;

FIG. 4B is a top view of the relief valve element of FIG. 4A;

DESCRIPTION OF THE PREFERRED EMBODIMENT

Figure 1A:
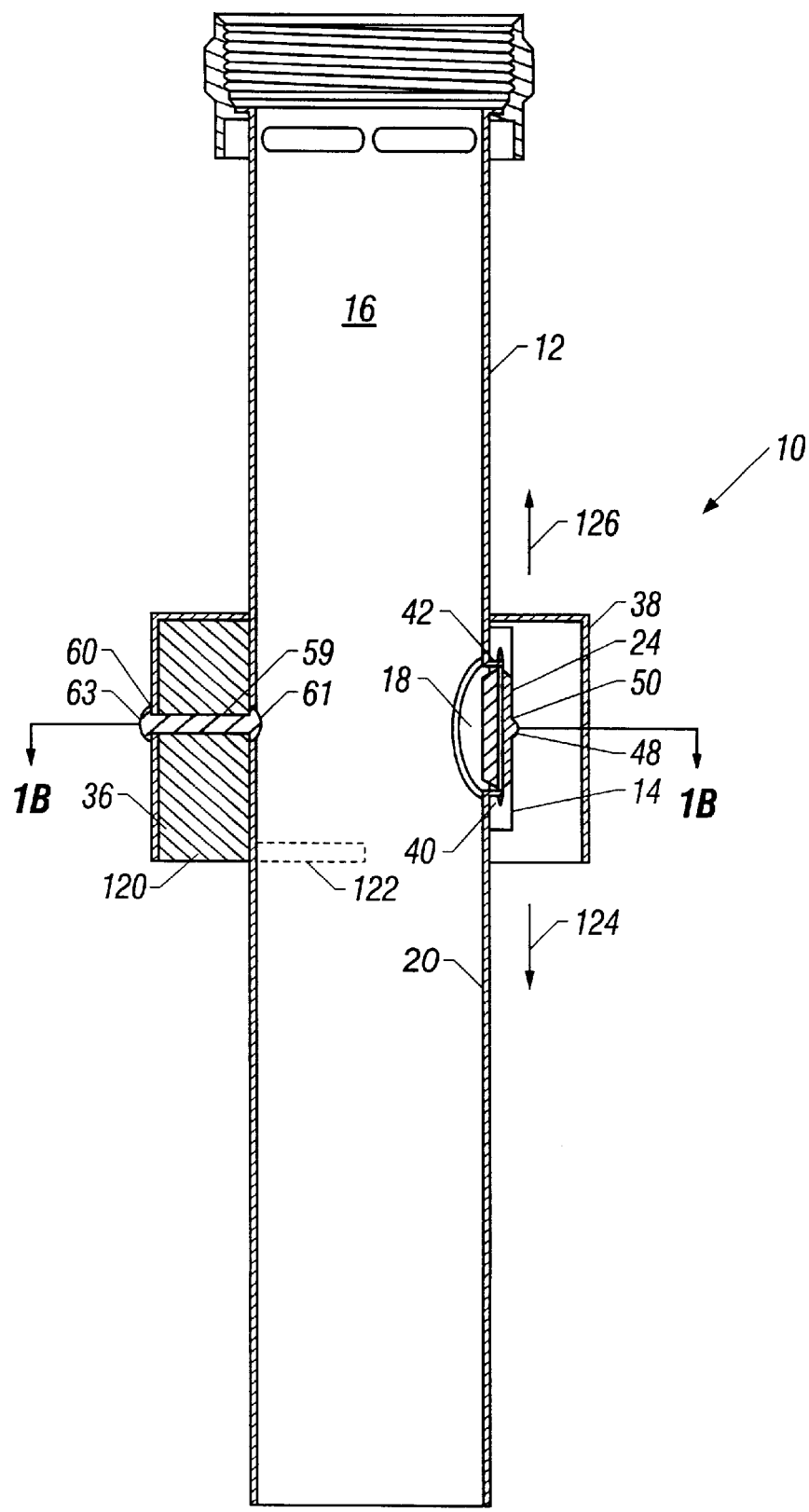
FIG. 1A is a cross-sectional view of a relief valve assembly of the invention shown in a sealing position.
Figure 1B:
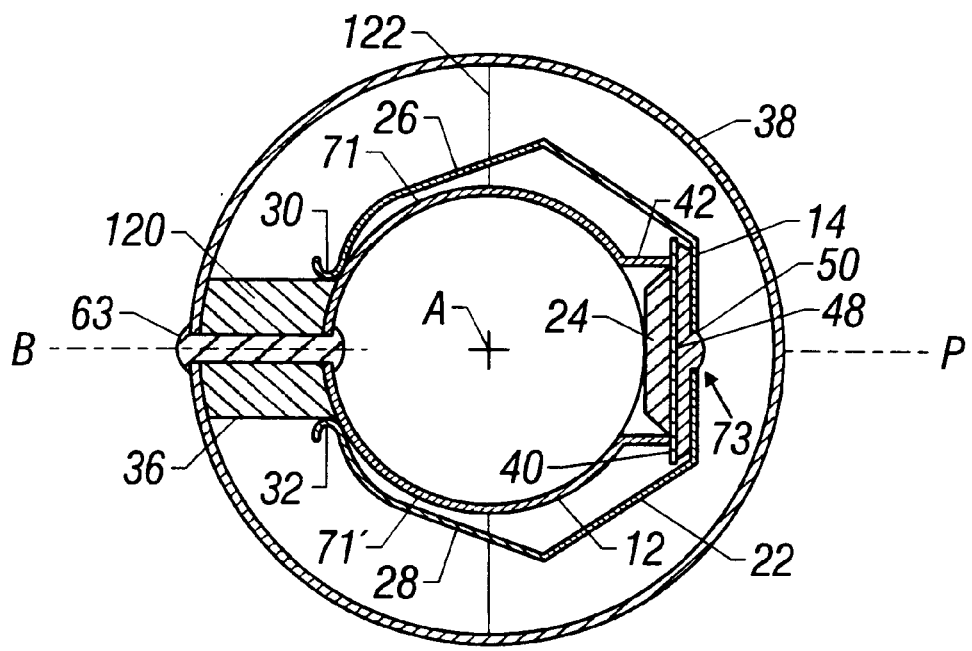
FIG. 1B is a cross-sectional view of the relief valve assembly, taken along lines 1B—1B in FIG. 1A.

Referring to FIGS. 1A and 1B, a pressure relief valve 10 for relieving fluid pressure within a housing 12 includes a spring clip assembly 14 for biasing a relief valve element 24. Relief valve element 24 is biased against a pressure relief aperture 18 in a wall 20 of housing 12. Housing 12, e.g., a threaded pipe, defines a flow passageway 16. When pressure within flow passageway 16 rises above a predetermined level, e.g., 12 psi, relief valve element 24 is unseated from aperture 18 against the force of spring clip assembly 14 to relieve pressure within housing 12.

A guide 36 is mounted to housing 12 opposite aperture 18. The vertical cross-section of aperture 18, the plane of which runs through its axis, the vertical cross-section of guide 36, the plane of which runs through its centerline, and the pipe or housing flow axis, A, lie in a common plane, P. Plane, P, contains an axis, B, along which valve element 24 moves. A shroud 38 surrounds housing 12. Guide 36 has a through bore 59, shroud 38 has a hole 60, and housing 12 has a hole 61. Guide 36 and shroud 38 are connected to housing 12 by a fastener, e.g., a rivet 63, extending through bore 59, hole 60 and hole 61.

Referring particularly to FIG. 1B, spring clip assembly 14 includes a spring 22 having arms 26, 28 terminating in housing contact free ends 30, 32, respectively. Free ends 30, 32 are in sliding engagement upon outer, cam surfaces 71, 71', respectively, of housing 12. In a central region 73 of spring 22 is an aperture 50 for receiving and locating an alignment post 48 of relief valve element 24. Relief valve element 24 is urged into sealing engagement upon a formed seat 42 defining aperture 18. A gasket 40 is compressed in sealing engagement between a planar sealing surface 66 (FIG. 4A) of relief valve element 24 and formed seat 42 when the relief valve element is in the closed position of FIG. 1B.

Figure 2:
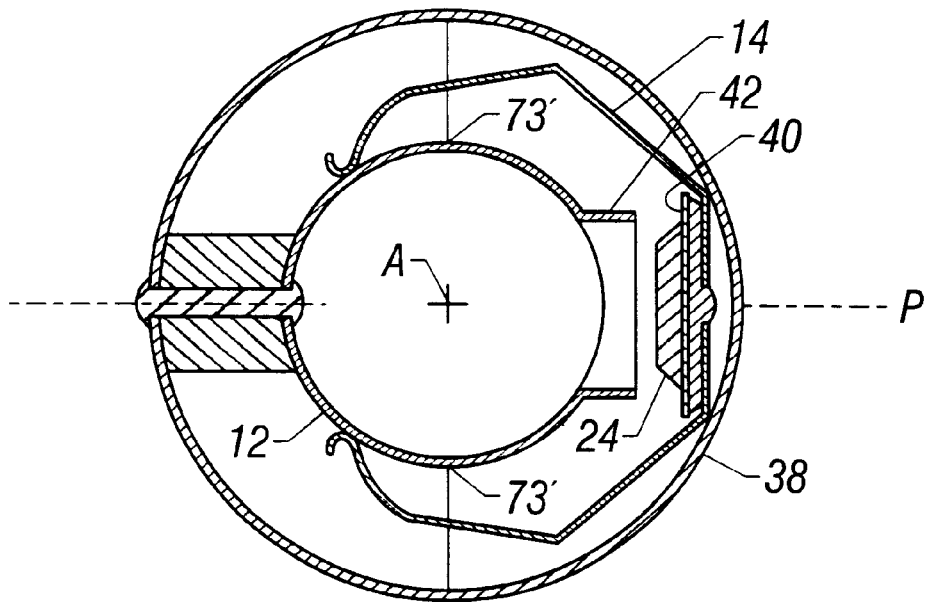
FIG. 2 is a cross-sectional view of the relief valve assembly shown in an open, pressure relief position.
Figure 5A:
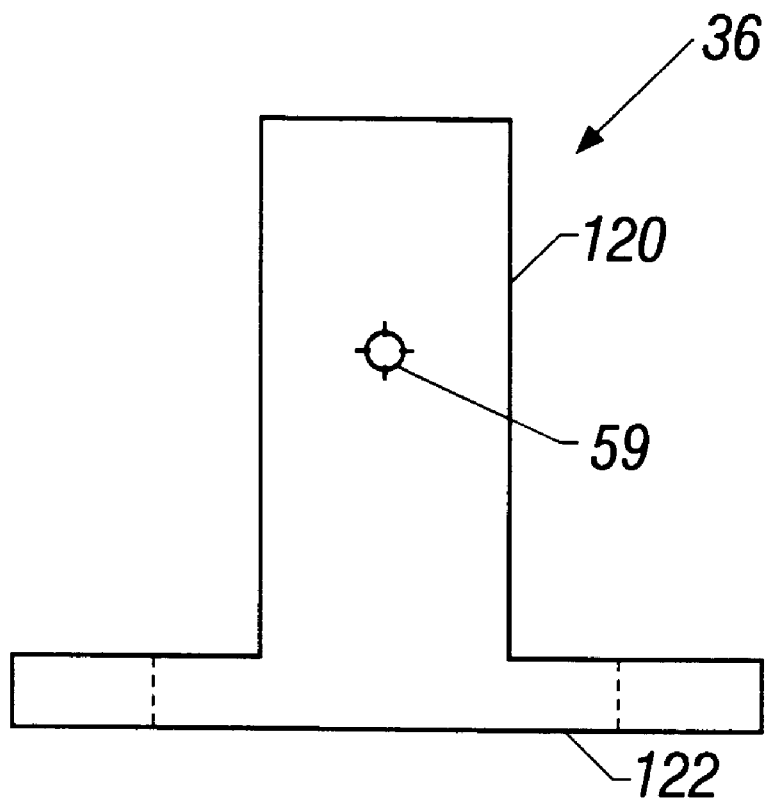
FIG. 5A illustrates a guide of the relief valve assembly.
Figure 5B:
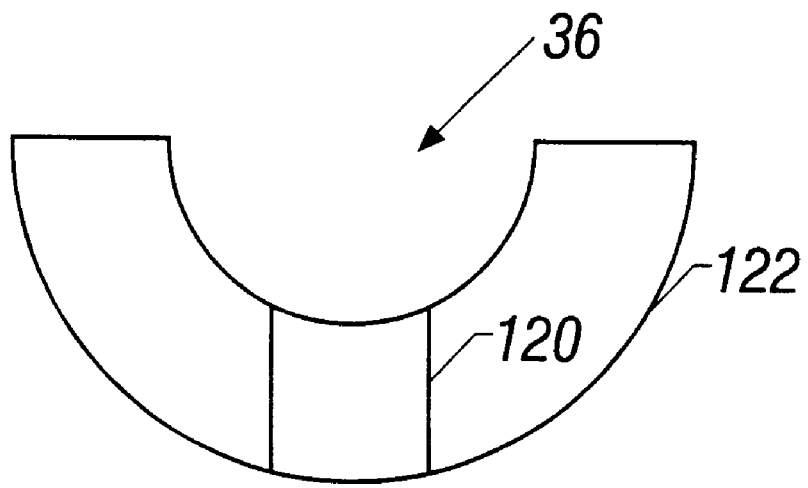
FIG. 5B is a top view of the guide of FIG. 5A.

Referring to FIG. 2, when the pressure within housing 12 rises above the predetermined level, valve element 24 is urged toward an open, pressure relief position in which gasket 40 is lifted off seat 42 thus allowing relief of pressure from within housing 12. This movement of valve element 24 toward its open position occurs against the biasing force exerted by spring 22 and causes spring arm free ends 30, 32 to move along cam surfaces 71, 71', respectively.

The spacing of free ends 30, 32 from valve axis, B, increases as free ends 30, 32 move along cam surfaces 71, 71' during movement of valve element 24 toward its open position. This increase spacing causes an increase in spring force of free ends 30, 32 upon cam surface 71, 71' resulting in maintaining a constant predetermined spring force component, e.g., 12 pounds, urging valve element 24 toward its sealed position. The escaping fluid maintains an opening force on valve element 24. The valve element remains separated from seat 42 as long as the force exerted by the escaping fluid is greater than the constant predetermined spring force component.

Shroud 38 prevents movement of free spring ends 30, 32 along cam surface 71, 71' beyond the inversion points 73, 73', respectively, of the cam surface. This restricts release of spring clip assembly 14 from housing 12. When the excess pressure is vented, valve element 24 reseats on seat 42 to seal aperture 18. Alignment post 48 and guide 36 aid in properly positioning valve element 24 against seat 42 under the biasing force exerted by spring 22.

Referring to FIGS. 3A and 3B, arms 26, 28 extend from a midline 91 of spring 22. Aperture 50 is located at midline 91. Each arm 26, 28 includes a first region 100 having a length, $L_1$, of, e.g., 0.5", a second region 102 having a length, $L_2$, of, e.g., 0.7", and a third region 104 having a length, $L_3$, of, e.g., 0.8". First region 100 and second region 102 define an angle, $\alpha$, of, e.g., 120°, therebetween, and second region 102 and third region 104 define an angle, $\beta$, of, e.g., 105°, therebetween. Contact ends 30, 32 are radi-used at, e.g., about 0.03". Spring 22 has a width, W, of, e.g., 1.0". Spring 22 dimensioned as described above is particularly suited for a housing having an outer diameter of 1.5". Spring 22 is preferably formed of, e.g., spring steel.

Referring to FIGS. 4A and 4B, relief valve element 24 includes an upper section 110 and a lower section 112 secured together by a screw 114. Gasket 40 is sandwiched between upper and lower sections 110, 112. Alignment post 48 is formed by the end of screw 114.

Referring to FIGS. 1A, 1B, 5A and 5B, guide 36 has an axial extension 120 and circumferential section 122. Axial extension 120 helps to center spring 22 when the spring moves toward the closed position of FIG. 1B. Circumferential section 122 restricts axial movement of spring 22 in the direction of arrow 124 (FIG. 1A).

Figure 6A:
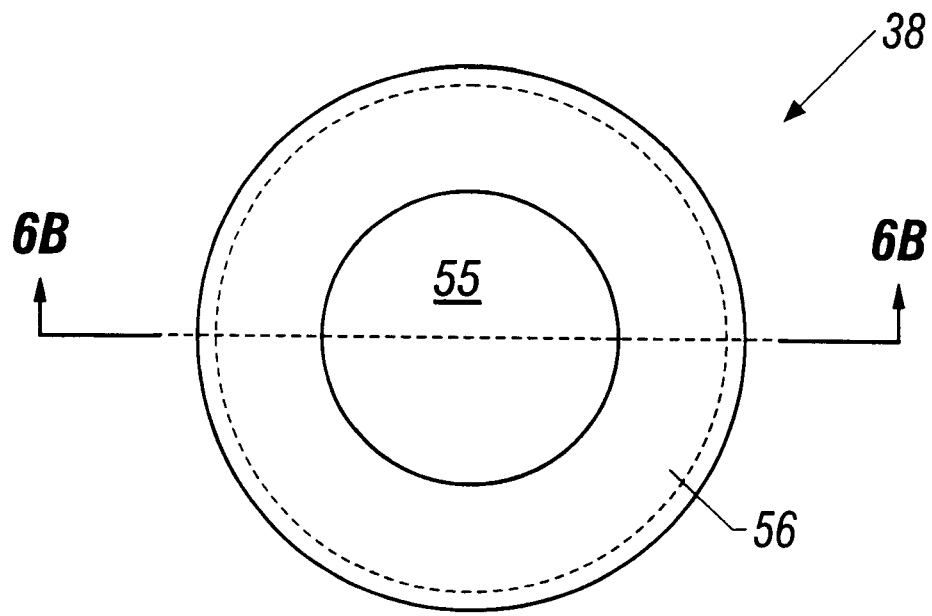
FIG. 6A is a top view of a shroud of the relief valve assembly.
Figure 6B:
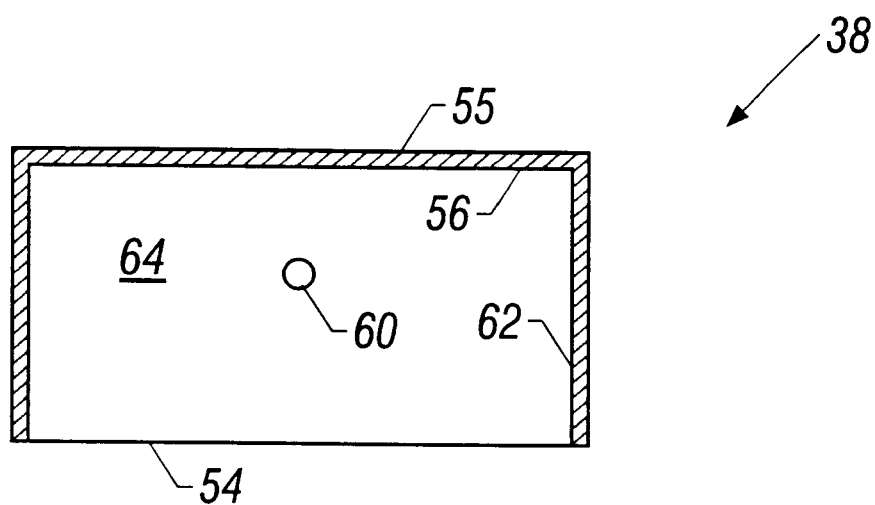
FIG. 6B is a cross-sectional view of the shroud, taken along lines 6B—6B in FIG. 6A.

Referring to FIGS. 6A and 6B, shroud 38 has a bore 64 for receiving housing 12, spring clip assembly 14, and guide 36. A surface 56 of shroud 38 defines an opening 55 for the passage of housing 12 therethrough. Surface 56 directs gas and liquids vented from housing 12 downwardly (arrow 124) away from the user through an open end 54 of shroud 38. Surface 56 also restricts axial movement of spring clip assembly 14 along arrow 126 (FIG. 1A). Thus, spring clip assembly 14 is axially constrained between surface 56 of shroud 38 and circumferential section 122 of guide 36. An inner surface 62 of shroud 38 radially constrains spring 22.

Housing 12 can be incorporated into various pressure systems such as boilers, water heater, tanks, water lines in high rise apartments, and other pressure vessels.

Other embodiments are within the following claims.

Figure 7A:
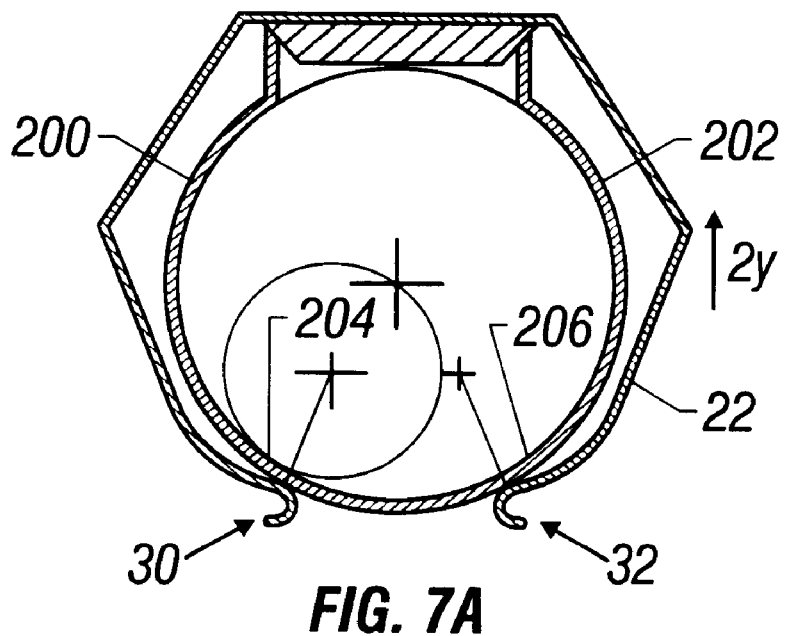
FIG. 7A illustrates an alternative embodiment of a cam surface of the relief valve assembly with the relief valve assembly shown in a sealing position.
Figure 7B:
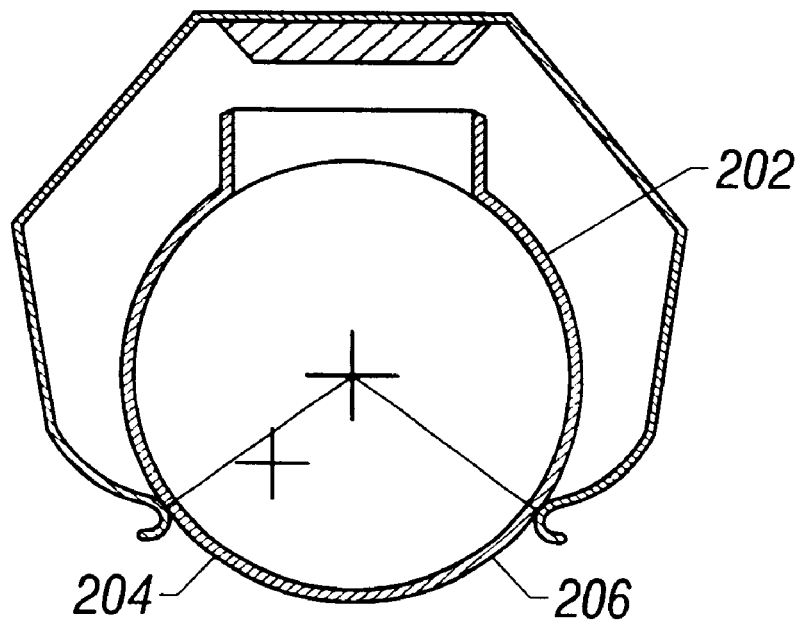
FIG. 7B shows the relief valve assembly of FIG. 7A in an open, pressure relief position.

The cam surface can be other than cylindrical. For example, referring to FIGS. 7A and 7B, a cam surface 200 is defined by a first surface section 202 with a radius, e.g., of ¾ inch, a second surface section 204 with a smaller radius, e.g., of ⅜ inch, and a third surface section 206 with the same radius as the second section. Due to the increase in radius of cam surface 200 in direction, y, the force required to be applied to spring 22 in direction y to maintain ends 30, 32 of the spring in contact with the first surface is less than the force required to maintain spring ends 30, 32 in contact with the second and third surfaces, respectively. Depending on the particular cam contour selected, the force required to separate valve element 24 from seat 42 can increase, remain constant, or decrease.

The cam surface can be defined by a collar which fits around the pipe and is contoured to control the force required to move the valve element away from the seat.

Figure 8A:
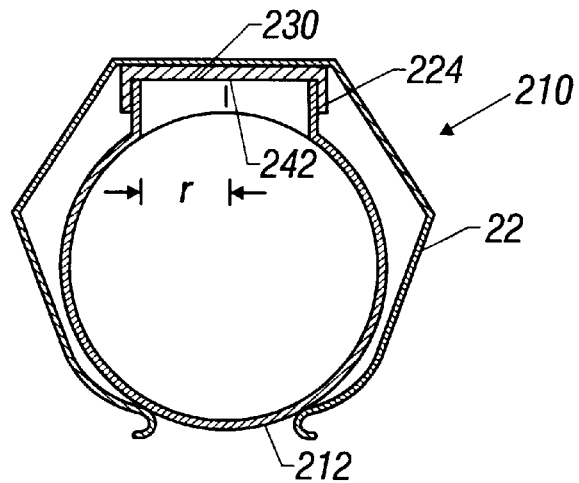
FIG. 8A illustrates an alternative embodiment of a valve element of the relief valve assembly with the valve assembly shown in a first, sealing position.
Figure 8B:
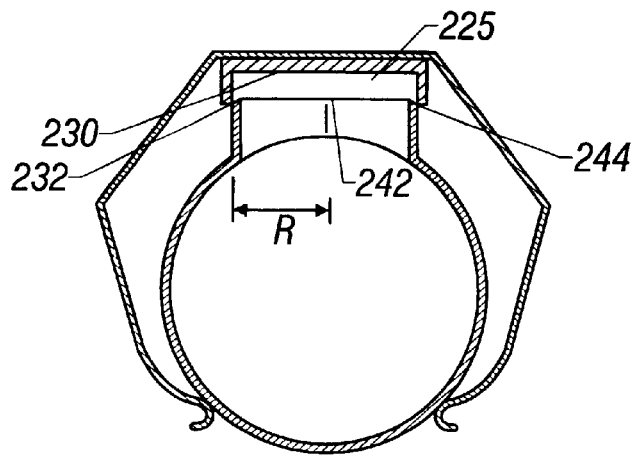
FIG. 8B shows the valve element of FIG. 8A in a second, sealing position.
Figure 8C:
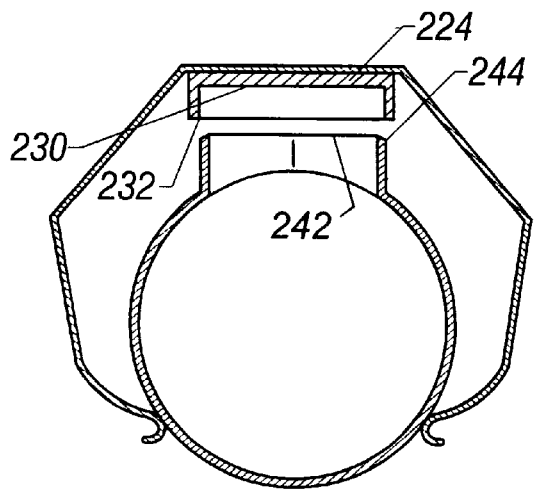
FIG. 8C shows the valve element of FIG. 8A in an open, pressure relief position.

Referring to FIGS. 8A–8C, a pressure relief valve 210 includes a valve element 224 defining a huddle chamber 225. When the valve is fully closed (FIG. 8A), a first sealing surface 230 of valve element 224 forms a seal with a first seat 242 of housing 212. When pressure within housing 212 increases above a predetermined level, fluid enters huddle chamber 225 and valve element 224 is lifted from first seat 242 and moved to a second position (FIG. 8B) in which a second sealing surface 232 of valve element 224 forms a seal with a second seat 244 of housing 212.

The force exerted by the fluid in housing 212 on valve element 224 is proportional to the square of the radius of the contact area of the fluid on the valve element. Since the radius, R, of seat 244 is greater than the radius, r, of seat 242, the force exerted on valve element 224 increases when the valve element moves to its second position. This increased force is enough to lift valve element 224 off seat 244 (FIG. 8C). The force of the fluid escaping from housing 212 holds valve element 224 in the open position.

What is claimed is:

1. A relief valve assembly comprising:
a valve element mounted for movement generally along a valve axis between a first, sealing position in sealing engagement upon a valve seat, and a second, relief position removed from sealing engagement with said valve seat;
a spring arm engaged with said valve element for urging said valve element toward said first, sealing position;
said spring arm having a free end engaged upon a cam surface, movement of said valve element between said first, sealing position and said second, relief position causing movement of said free end of said spring arm along said cam surface;
said cam surface being disposed relative to said valve axis in a manner whereby movement of said valve element toward said second, relief position causes movement of said free end of said spring arm along said cam surface in a manner to increase spacing of said free end of said spring arm from said valve axis.

2. The relief valve of claim 1 further comprising a pipe, wherein said cam surface comprises an outer surface of the pipe.

3. The relief valve of claim 1 further comprising a structure to limit displacement of said valve element away from said valve seat.

4. The relief valve of claim 3 wherein said structure comprises a shroud surrounding said spring arm.

5. The relief valve of claim 4 wherein said cam surface comprises an outer surface of a pipe, said pipe defines the valve seat and said shroud is mounted to said pipe opposite said valve seat.

6. The relief valve of claim 4 wherein said shroud is sized relative to said spring arm to restrict movement of said free end of said spring arm on said cam surface beyond a point of inversion.

7. The relief valve of claim 1 wherein said spring arm is formed from spring steel.

8. The relief valve of claim 1 wherein said spring arm and said cam surface are configured such that said valve element moves from said first sealing position at a pressure of about 12 psi.

9. The relief valve of claim 1 wherein movement of said free end of said spring arm along said cam surface in response to movement of said valve element toward said second, relief position, further causes an increase of spring force of said free end of said spring arm upon said cam surface, thereby to maintain a predetermined spring force component urging said valve element toward said first, sealing position.

10. The relief valve of claim 9 wherein said predetermined spring force component is substantially constant.

11. The relief valve of claim 1 further comprising an alignment pin for facilitating positioning of said spring arm relative to said valve element.

12. The relief valve of claim 1 further comprising a guide member for facilitating positioning of said spring arm relative to said valve element.

13. The relief valve of claim 1 wherein said valve element defines a first sealing surface and a second sealing surface, and said valve seat defines a first seating surface and a second seating surface, said first seating surface for engaging the first sealing surface to define a first seal when the valve element is in said first, sealing position, and said second seating surface for engaging the second sealing surface to define a second seal when the valve element is in a position between said first, sealing position and said second, relief position, a radius of the second seal being greater than a radius of the first seal.

14. A relief valve for an aperture defined in a wall of a pipe by a circumferential valve seat,
said relief valve comprising:
a valve element mounted for movement generally along a valve axis between a first, sealing position in sealing engagement upon said valve seat, and a second, relief position removed from sealing engagement with said valve seat;
a first spring arm and a second spring arm, each engaged with said valve element for urging said valve element toward said first, sealing position with a predetermined closing force;
said first spring arm having a free end engaged upon a first cam surface, movement of said valve element between said first, sealing position and said second, relief position causing movement of said free end of said first spring arm along said first cam surface, and said second spring arm having a free end engaged upon a second cam surface, movement of said valve element between said first, sealing position and said second, relief position causing movement of said free end of said second spring arm along said second cam surface;
said first cam surface and said second cam surface each being disposed relative to said axis in a manner whereby movement of said valve element toward said second, relief position causes movement of said free end of said first spring arm along said first cam surface and movement of said free end of said second spring arm along said second cam surface, both in a manner to increase spacing of said free ends of said first and second spring arms from said axis.

15. The relief valve of claim 14 wherein movement of said free end of said first spring arm along said first cam surface and movement of said free end of said second spring arm along said second cam surface, both in response to movement of said valve element toward said second, relief position, further cause an increase of spring force of said free end of said first spring arm upon said first cam surface and of said free end of said second spring arm upon said second cam surface, thereby to maintain a predetermined spring force component urging said valve element toward said first, sealing position.

16. The relief valve of claim 15 wherein said first spring arm and said second spring arm are located at opposed sides of said axis, said first spring arm and said second spring arm moving apart as said valve element moves toward said second, relief position.

17. The relief valve of claim 15 wherein said predetermined spring force component is substantially constant.

* * * * *